US005320448A

United States Patent [19]

Artzberger

[11] Patent Number: 5,320,448

[45] Date of Patent: * Jun. 14, 1994

[54] DRIVE MECHANISM FOR A VIBRATORY COMPACTOR

[75] Inventor: Thomas G. Artzberger, Hartford, Wis.

[73] Assignee: M-B-W, Inc., Slinger, Wis.

[ * ] Notice: The portion of the term of this patent subsequent to Sep. 22, 2009 has been disclaimed.

[21] Appl. No.: 894,527

[22] Filed: Jun. 5, 1992

[51] Int. Cl.[5] .......... E01C 19/36; F16H 33/20

[52] U.S. Cl. .......... 404/133.1; 74/61; 474/4

[58] Field of Search .......... 404/133.05, 133.1; 74/61, 87; 474/33, 38, 4; 192/105 R

[56] References Cited

U.S. PATENT DOCUMENTS

| | | | |
|---|---|---|---|
| 2,908,206 | 10/1959 | Melanson | 404/133.1 |
| 3,048,089 | 8/1962 | Kaltenegger | 74/61 |
| 3,703,127 | 11/1972 | Kaltenegger | 404/133.1 X |
| 3,730,037 | 5/1973 | Purrer | 83/68 |
| 3,753,621 | 8/1973 | Dale | 404/116 |
| 4,133,225 | 1/1979 | Love | 475/19 |
| 4,237,983 | 12/1980 | Allen | 172/42 |
| 4,289,042 | 9/1981 | Brown | 74/61 |
| 4,499,779 | 2/1985 | Maass | 74/61 |
| 4,643,611 | 2/1987 | Pilachowski | 74/61 X |
| 5,064,053 | 11/1991 | Baker | 74/61 X |
| 5,149,225 | 9/1992 | Artzberger | 404/133.1 |

FOREIGN PATENT DOCUMENTS

| | | | |
|---|---|---|---|
| 1634492 | 6/1970 | Fed. Rep. of Germany | 404/133.1 |
| 1634246 | 7/1970 | Fed. Rep. of Germany | 404/133.1 |

*Primary Examiner*—Allan D. Herrmann
*Attorney, Agent, or Firm*—Andrus, Sceales, Starke & Sawall

[57] ABSTRACT

The compactor includes a frame which carries a soil-compacting plate and a drive mechanism, such as a gasoline engine, is mounted on the frame and has a rotatable drive shaft. A pair of eccentrically weighted shafts are mounted for rotation on the frame and the weights are in the same phase relation on the shafts. A belt drive connects the drive shaft to at least one of the eccentric shafts, and a timing belt is connected between the eccentric shafts, so that both eccentric shafts rotate in the same direction to vibrate the compactor plate and affect travel of the compactor over the terrain.

9 Claims, 1 Drawing Sheet

DRIVE MECHANISM FOR A VIBRATORY COMPACTOR

BACKGROUND OF THE INVENTION

A conventional walk-behind soil compactor includes a frame that carries a generally horizontal compaction plate which is adapted to engage and compact soil or other material. To provide vibratory compacting action, one or more eccentric shafts are journaled for rotation on the frame, and a power source, such as a gasoline engine, is mounted on the frame and the drive shaft of the engine is operably connected to the eccentric shafts to rotate the shafts and provide the vibratory motion.

A walk-behind soil compactor can either be unidirectional, in which the compactor will move only in a single direction over the terrain, or it can be bidirectional or reversible. A typical unidirectional compactor includes a single eccentric shaft, which is normally mounted at the front of the compactor plate, while the engine is mounted adjacent the rear of the plate. With this construction, the rear of the plate, which carries the engine, tends to drag on the ground or terrain, which slows down the travel of the compactor. Moreover, due to the fact that the eccentric shaft is located adjacent the front of the plate, a greater vibrational output occurs at the front of the plate than at the rear, so that the vibratory output is not uniform across the surface area of the compactor plate.

In an attempt to remedy these problems, it has been proposed to mount the eccentric shaft of the unidirectional compactor centrally between the forward and rear ends of the compactor plate. While this construction provides a more uniform vibrational output over the surface area of the compactor plate, it results in a higher profile for the compactor and reduces the speed of travel over the ground.

With a conventional reversible soil compactor, a pair of parallel eccentric shafts are mounted for rotation on the frame, and the drive shaft of the engine is connected to the eccentric shafts through a gear train which is arranged so that the eccentric shafts rotate simultaneously and in opposite directions. To provide forward and rear movement for the compactor, the phase relationship of the weights on the eccentric shafts is changed by a shifting mechanism. The shifting mechanism is very complex, and as it is directly associated with the eccentric shafts, the shifting mechanism is subjected to intense vibration, and therefore has a relatively short service life.

As a further problem, the eccentric shafts are continuously rotating in opposite directions, so that torque generated by one shaft will oppose the torque generated by the second eccentric shaft. Because of this and the weight resulting from the complex shifting mechanism, the speed of travel of the compactor is substantially reduced over a similarly powered unidirectional compactor.

U.S. Pat. No. 5,149,225, is directed to an improved reversible walk-behind vibratory soil compactor in which a reversible clutch is associated with the drive shaft of the engine and selectively connects each eccentric shaft via a drive belt to the drive shaft. The drive belts are arranged so that the eccentric shafts are rotated in opposite directions, but not simultaneously.

Through use of a manual shifting mechanism, the reversible clutch can be shifted between a neutral position, a first engaged position where one of the belts connects the drive shaft to a first of eccentric shafts to rotate that shaft and cause movement of the compactor in a first direction, and a second engaged position, where the other drive belt is connected to the second eccentric shaft to rotate that shaft and cause movement of the compactor in the opposite or reverse direction.

With the construction as described in the aforementioned patent application, only one drive belt is engaged in any instant, so that the torque generated by one eccentric shaft does not oppose or fight the torque generated by the second eccentric shaft, thus enabling the speed of travel to be substantially increased with the same power input.

SUMMARY OF THE INVENTION

The invention is directed to an improved drive mechanism for a walk-behind vibratory soil compactor. The compactor includes a frame which carries a compactor plate that is adapted to engage and compact the soil or other material. A pair of eccentrically weighted shafts are journaled for rotation on the frame, and the weights on the eccentric shafts are in the same phase relation.

In a unidirectional embodiment of the invention, separate belt drives connect the drive shaft to the eccentric shafts and the belt drives are arranged to rotate the eccentric shafts in the same direction. Rotation of the two eccentric shafts is synchronized, preferably by a timing belt that is connected between the two eccentric shafts.

With this construction, the two eccentric shafts operate in phase to obtain a greater vibrational output for a given size of eccentric shaft, or alternately, the size of the eccentric shafts and the supporting bearings can be reduced for the same vibrational output.

As the eccentric shafts are rotated simultaneously and are located on either side of the fore and aft midpoint of the compactor plate, a more uniform vibrational output is achieved throughout the surface area of the compactor plate. Moreover, the power source or gasoline engine can be located between the eccentric shafts providing a lower profile and center of gravity for the compactor.

In the reversible embodiment of the invention, a reversible clutch mechanism is associated with the drive shaft of the engine and selectively connects the drive shaft via drive belts to the respective eccentric shafts. The belt drives are arranged so that the eccentric shafts rotate in opposite directions. By connecting one of the eccentric shafts to the drive shaft, the compactor will move in a forward direction, and conversely, by connecting the other of the eccentric shafts to the drive shafts, the compactor will move in a reverse direction. In addition, a timing belt interconnects the two eccentric shafts.

The reversible clutch can be moved between a neutral position, a first engaged position, where the drive shaft is connected by one of the belt drives to a first of the eccentric shafts, and a second engaged position where the other of the belts connects the drive shaft to the second eccentric shaft. Rotation of the eccentric shaft that is being driven is transmitted via the timing belt to the other eccentric shaft so that both eccentric shafts will always be rotating in the same direction. Through shifting of the reversible clutch, the direction of rotation of the two eccentric shafts can be changed to thereby provide forward and reverse travel for the compactor.

With this construction, the two eccentric shafts are in phase so that the torque generated by one eccentric shaft does not oppose or fight the torque generated by the second eccentric shaft. This enables the speed of travel of the compactor to be substantially increased with the same power input.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
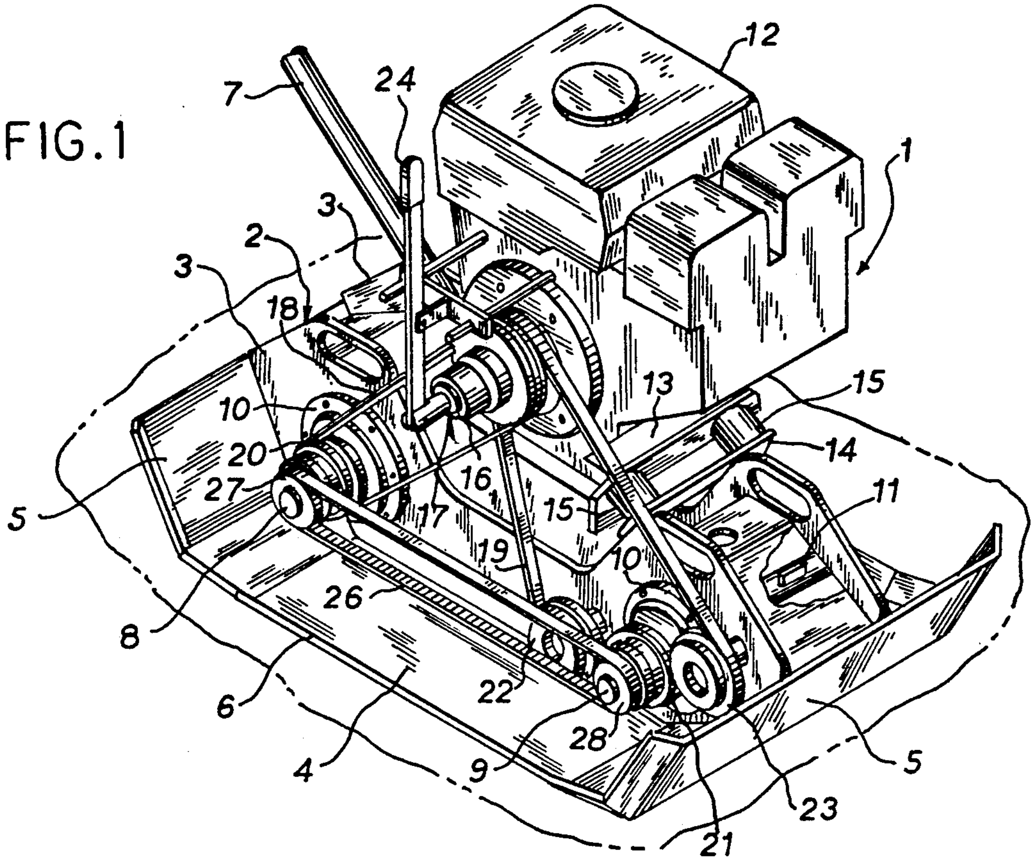
FIG. 1 is a perspective view of a reversible walk-behind vibratory compactor incorporating the drive mechanism of the invention.

The reversible vibratory compactor 1, as shown in FIG. 1, includes a frame 2 having a pair of spaced parallel side plates 3, the lower edges of which are secured to a compactor plate 4 which is adapted to engage the material to be compacted. The forward and rear ends of the compactor plate 4 are inclined upwardly, as indicated by 5, and each side edge of plate 4 is provided with an upturned flange 6. A handle 7, to be engaged by an operator, is connected to the frame 2.

A pair of eccentric vibratory shafts 8 and 9 are journaled in the side plates by bearing assemblies 10, and each shaft 8, 9 carries one or more eccentric weights 11. The eccentric weights 11 on shafts 8 and 9 are in the same phase relation, meaning that if the eccentricity of one shaft is located at two o'clock the eccentricity of the other shaft is at the same two o'clock position. The rotation of the eccentric shafts 8 and 9 will provide vibratory action for compactor plate 4.

A power source, such as a gasoline engine 12, is supported on a mounting plate 13 which is in turn is connected to plate 14 of frame 2 through isolation mounts 15. Isolation mounts 15 are formed of a resilient material, such as rubber, and act to minimize the transmission of vibrations from frame 2 to the engine 12 and handle 7.

Engine 12 includes a horizontal drive shaft 16 and a reversible clutch mechanism 17 selectively connects the drive shaft 16 to the eccentric shafts 8 and 9 through belts 18 and 19, respectively. The clutch mechanism 17 can be constructed as disclosed in copending U.S. Pat. No. 5,149,225, and the construction of that patent application is incorporated herein by reference.

Belt 18, which has a generally v-shaped cross section, is trained between clutch 17 and a pulley 20 on eccentric shaft 8 while belt 19, which has a generally hexagonal cross section, connects the clutch with a pulley 21 on shaft 9. In addition, belt 21 passes around idler pulleys 22 and 23. With this drive arrangement, shaft 9 will rotate in the opposite direction from shaft 8.

Clutch 17, as described in the aforementioned patent application, has a neutral position, a first engaged position, where the drive shaft 16 is connected through belt 18 to eccentric shaft 8, and second engaged position, where the drive shaft 16 is connected through belt 19 to eccentric shaft 9. Thus, operation of the clutch selectively connects either the shafts 8 or 9 to the drive shaft 16 so that only one of the eccentric shafts will be driven by drive shaft 16. Driving of shaft 8 will move the compactor in one direction, while driving of eccentric shaft 9 will move the compactor in the opposite direction. The clutch can be moved between the neutral and the first and second engage positions through manual operation of the lever 24 as described in the aforementioned patent application.

In accordance with the invention, rotation of the driven eccentric shaft 8, 9 is transmitted to and synchronized with the rotation of the other eccentric shaft. This can be accomplished by a timing belt 26 which connects a pulley 27 on shaft 8 with a pulley 28 on shaft 9.

When clutch 17 is moved to a first engaged position, rotation of drive shaft 16 will be transmitted through belt 18 to eccentric shaft 8 to rotate shaft 8, and belt 19 will be inoperative. Rotation of shaft 8 is transmitted through timing belt 26 to shaft 9 so that shafts 8 and 9 will rotate in the same direction. Rotation of shafts 8 and 9 will not only vibrate the compactor plate but cause the compactor to move in a first direction over the terrain.

By shifting the clutch 17 to the second engaged position, belt 18 will be inoperative and belt 19 will connect drive shaft 16 with eccentric shaft 9 to thereby rotate shaft 9. Rotation of shaft 9 is transmitted through timing belt 26 to shaft 8. In this mode, both shafts 8 and 9 will rotate in the same direction, but in the opposite direction from the first mode, thereby causing the compactor to move in the opposite direction over the terrain.

Figure 2:
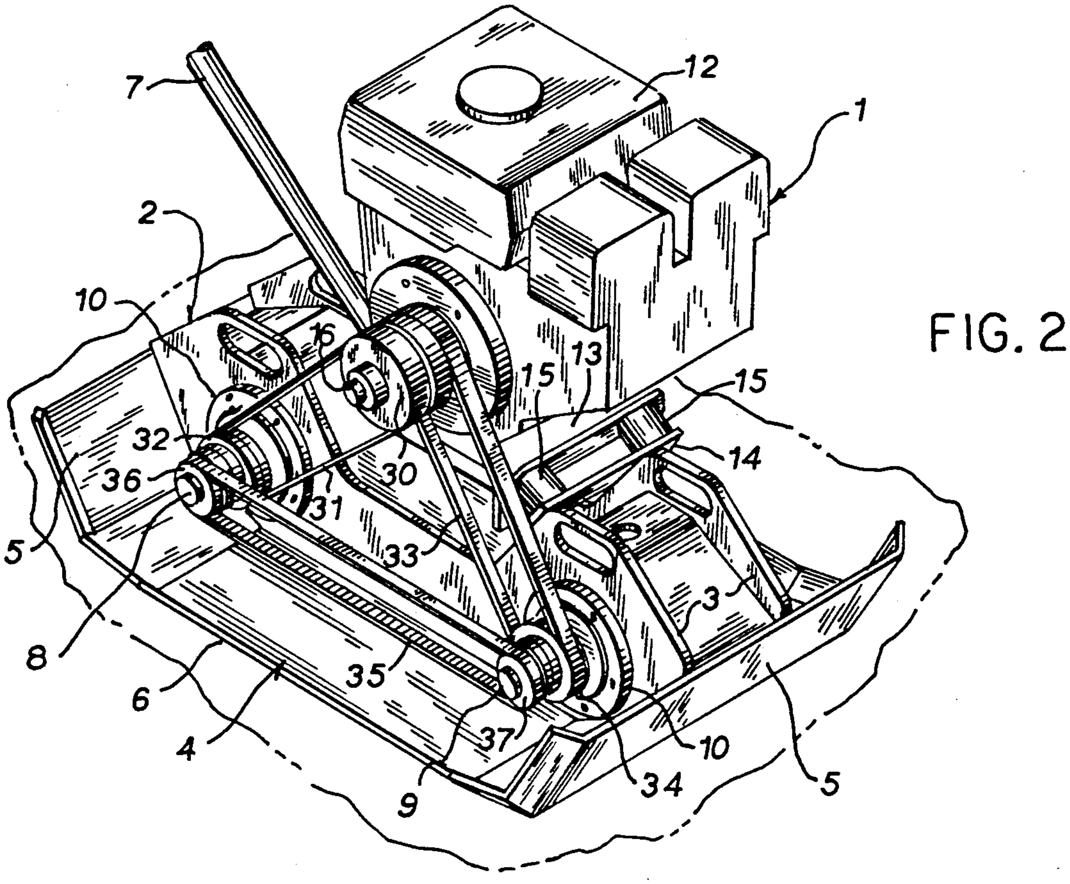
FIG. 2 is a perspective view of a second embodiment of the invention showing a unidirectional vibratory compactor.

FIG. 2 shows the invention as incorporated with a unidirectional compactor and in this embodiment a centrifugal clutch 30 is mounted on drive shaft 16 and a belt 31 connects clutch 30 with a pulley 32 mounted on eccentric shaft 8. In addition, a belt 33 connects clutch 30 with a pulley 34 on eccentric shaft 9. When the speed of the engine reaches a predetermined value, centrifugal clutch 30 will engage to connect the drive shaft to both the eccentric shafts 8 and 9, thus rotating shafts 8 and 9 in the same direction.

Rotation of shafts 8 and 9 is synchronized to maintain the eccentricity of the shafts in phase relation by a timing belt 35 which connects a pulley 36 on shaft 8 with a pulley 37 on shaft 9.

With the drive mechanism of the invention, both eccentric shafts 8, 9 are rotated in the same direction, thereby providing a greater vibrational output for a given size shaft, or alternately, enabling the size of the shafts and the bearings to be reduced for a given vibratory output.

As the eccentric shafts 8 and 9 are spaced fore and aft of the center of the compactor plate. A more uniform vibrational output is achieved throughout the surface area of the plate.

As both eccentric shafts 8 and 9 rotate in the same direction, the soil particles will tend to rotate in the opposite direction and this rotational movement imparted to the soil particles will aid in settling and compaction, as opposed to a compactor in which the eccentric shafts rotate in opposite directions and energy spikes are obtained.

While FIG. 2 illustrates a pair of belts 31 and 33, connecting the clutch 30 with the eccentric shafts 8 and 9, it is contemplated that a single belt can be connected between the clutch and one of the eccentric shafts, and the timing belt 25 will then transmit rotation of the driven eccentric shaft to the other eccentric shaft.

Similarly, it is contemplated that other synchronized drive mechanisms, such as a chain drive or a gear train can be substituted for the timing belts 26 and 35.

Various modes of carrying out the invention are contemplated as being within the scope of the following claims, particularly pointing out and distinctly claiming the subject matter which is regarded as the invention.

I claim:

1. A vibratory compactor, comprising a frame, compaction means mounted on the frame and adapted to engage a material to be compacted, drive means mounted on the frame and including a drive shaft, a pair of eccentric shafts mounted for rotation on the frame, first connecting means for connecting said drive shaft with an eccentric shaft to drive the connected eccentric shaft in the same direction as the direction of rotation of said drive shaft, second connecting means connecting the drive shaft with an eccentric shaft for driving the connected eccentric shaft in an opposite direction from the direction of rotation of said drive shaft, clutch means operably connected to said drive shaft for selectively connecting said first and second connecting means with said drive shaft, and synchronizing means interconnecting said eccentric shafts and constructed and arranged to drive both eccentric shafts in the same rotational direction and at the same speed.

2. The compactor of claim 1, wherein said synchronizing means comprises a timing belt.

3. The compactor of claim 1, wherein said first connecting means comprises a belt drive.

4. The compactor of claim 1, wherein said first and second connecting means are belt drives, said clutch means having a first position where said drive shaft is engaged with said first belt drive and has a second position where said drive shaft is engaged with the second belt drive.

5. The compactor of claim 4 and including shifting means for shifting said clutch means between the first and second positions.

6. A vibratory compactor, comprising a frame, compaction means mounted on the frame and adapted to engage a material to be compacted, drive means mounted on the frame and including a drive shaft, a pair of eccentric shafts mounted for rotation on the frame, first connecting means for connecting the drive shaft with a first of said eccentric shafts for rotating said first eccentric shaft in a first direction, second connecting means for connecting said drive shaft with a second of said eccentric shafts for rotating said second eccentric shaft in a second direction opposite from said first direction, clutch means operably connected to the drive shaft for selectively connecting each connecting means with said drive shaft for selectively rotating each eccentric shaft to provide forward and reverse movement for said compactor, and synchronizing means connecting said first eccentric shaft directly to said second eccentric shaft and constructed and arranged to drive both eccentric shafts in the same rotational direction and at the same speed.

7. The compactor of claim 6, where each eccentric shaft includes an eccentric weight and the eccentric weights of said eccentric shafts are in the same phase relation throughout the complete rotation movement of said eccentric shafts.

8. The compactor of claim 6, wherein said drive means is located centrally of the fore and aft ends of said compactor and said eccentric shafts are located on opposite sides of said drive means.

9. A vibratory compactor, comprising a frame, compaction means mounted on the frame and adapted to engage a material to be compacted, drive means mounted on the frame and including a drive shaft, a pair of eccentric shafts mounted for rotation on the frame, first connecting means for connecting said drive shaft with at least one of said eccentric shafts, synchronizing means for connecting said one eccentric shaft to the other of said eccentric shafts, said synchronizing means being constructed and arranged to drive both eccentric shafts in the same rotational direction, and centrifugal clutch means interconnecting said first connecting means and said drive shaft, said centrifugal clutch means being constructed and arranged to provide a driving connection between said drive shaft and said first connecting means when said drive shaft rotates at a predetermined speed.

* * * * *